(12) United States Patent
Ichikawa et al.

(10) Patent No.: US 11,476,054 B2
(45) Date of Patent: Oct. 18, 2022

(54) FILM CAPACITOR AND METALLIZED FILM

(71) Applicant: Murata Manufacturing Co., Ltd., Nagaokakyo (JP)

(72) Inventors: Tomomichi Ichikawa, Nagaokakyo (JP); Tomoki Inakura, Nagaokakyo (JP); Shinichi Kobayashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 225 days.

(21) Appl. No.: 16/814,183

(22) Filed: Mar. 10, 2020

(65) Prior Publication Data

US 2020/0211778 A1 Jul. 2, 2020

Related U.S. Application Data

(63) Continuation of application No. PCT/JP2018/022889, filed on Jun. 15, 2018.

(30) Foreign Application Priority Data

Nov. 15, 2017 (JP) .............. JP2017-220110

(51) Int. Cl.
*H01G 4/32* (2006.01)
*H01G 4/008* (2006.01)
*H01G 4/14* (2006.01)

(52) U.S. Cl.
CPC ............... *H01G 4/32* (2013.01); *H01G 4/008* (2013.01); *H01G 4/14* (2013.01)

(58) Field of Classification Search
CPC ............ H01G 4/32; H01G 4/008; H01G 4/14
USPC ........ 361/301.4, 303, 321.1, 301.5, 311, 323
See application file for complete search history.

(56) References Cited

U.S. PATENT DOCUMENTS

| 5,840,402 | A | 11/1998 | Roberts et al. |
| 8,228,661 | B2 | 7/2012 | Ito et al. |
| 8,461,462 | B2* | 6/2013 | Hayashi ............... H05K 3/4602 361/728 |
| 9,105,408 | B2 | 8/2015 | Ichikawa et al. |

(Continued)

FOREIGN PATENT DOCUMENTS

| CN | 1165608 A | 11/1997 |
| CN | 101996767 A | 3/2011 |

(Continued)

OTHER PUBLICATIONS

International Search Report issued for PCT/JP2018/022889, dated Sep. 11, 2018.

(Continued)

*Primary Examiner* — Arun Ramaswamy
(74) *Attorney, Agent, or Firm* — ArentFox Schiff LLP

(57) ABSTRACT

A film capacitor that includes a metallized film having a metal layer on one surface of a dielectric resin film, in which, when a thermal expansion coefficient of the metallized film is $\alpha_P$ and a thermal expansion coefficient of the metal layer is $\alpha_M$, a value of $\alpha_P/\alpha_M$ is 5.1 or less.

20 Claims, 1 Drawing Sheet

(56) References Cited

U.S. PATENT DOCUMENTS

| | | | |
|---|---|---|---|
| 2008/0106845 A1* | 5/2008 | Kunimatsu | H01G 4/008 |
| | | | 361/303 |
| 2011/0032656 A1 | 2/2011 | Ito et al. | |
| 2014/0368970 A1* | 12/2014 | Ichikawa | C08L 71/10 |
| | | | 361/301.5 |

FOREIGN PATENT DOCUMENTS

| | | |
|---|---|---|
| JP | H03241804 A | 10/1991 |
| JP | H11214250 A | 8/1999 |
| JP | 2003160727 A | 6/2003 |
| JP | 200888387 A | 4/2008 |
| JP | 5794380 B2 | 10/2015 |
| JP | 2017183461 A | 10/2017 |
| WO | 2013128726 A1 | 9/2013 |

OTHER PUBLICATIONS

Written Opinion of the International Searching Authority issued for PCT/JP2018/022889, dated Sep. 11, 2018.

* cited by examiner

FILM CAPACITOR AND METALLIZED FILM

CROSS REFERENCE TO RELATED APPLICATIONS

The present application is a continuation of International application No. PCT/JP2018/022889, filed Jun. 15, 2018, which claims priority to Japanese Patent Application No. 2017-220110, filed Nov. 15, 2017, the entire contents of each of which are incorporated herein by reference.

FIELD OF THE INVENTION

The present invention relates to a film capacitor and a metallized film.

BACKGROUND OF THE INVENTION

As one kind of a capacitor, there is a film capacitor that has a stacked structure having a metallized film with a metal layer provided on one surface of a flexible dielectric resin film.

As a dielectric resin film for the film capacitor, it is described, for example, in Patent Document 1 to use a dielectric resin film made of a thermosetting resin. A resin composition constituting the dielectric resin film described in Patent Document 1 is a cured product obtained by a reaction of at least two types of organic materials including a first organic material and a second organic material. The first organic material is polyol, and the second organic material is an isocyanate compound, an epoxy resin, or a melamine resin having a plurality of functional groups in the molecule. The resin composition includes a first atom group including at least one functional group selected from among a methylene group ($CH_2$ group), an aromatic ring and an ether group (—O— group) and having a relatively small molar polarizability; and a second atom group including at least one functional group selected from among a hydroxyl group (OH group), an amino group (NH group) and a carbonyl group (C=O group) and having a relatively large molar polarizability, and the resin composition is characterized in that a value calculated from the formula (sum of absorption band intensities of first atom group)/(sum of absorption band intensities of second atom group) is 1.0 or more.

Patent Document 1: Japanese Patent No. 5794380

SUMMARY OF THE INVENTION

In recent years, film capacitors are required to have heat resistance that enables use in a high temperature range of 125° C. or higher. On the other hand, since a difference in thermal expansion coefficient between the metal layer and the resin film is large, particularly when the film capacitor is repeatedly used in a high temperature range, a load on the resin film increases due to a thermal expansion difference therebetween. As a result, the metal layer of the metallized film may be damaged, such as by peeling or cracking.

Patent Document 1 describes that when a cured product is obtained by a reaction of at least two types of organic materials, a glass transition point of a resin composition can be made 130° C. or higher, and therefore heat resistance of the dielectric resin film is increased and a guaranteed temperature of the film capacitor can be made high, for example, 125° C. or higher.

However, Patent Document 1 has not studied heat resistance when a film capacitor is repeatedly used in a high temperature range.

The present invention has been made to solve the above problems, and an object thereof is to provide a film capacitor which has excellent heat resistance when repeatedly used in a high temperature range and in which damage to a metal layer of a metallized film is suppressed. Another object of the present invention is to provide a metallized film for the film capacitor.

A film capacitor of the present invention is a film capacitor that includes a metallized film having with a metal layer on one surface of a dielectric resin film, in which, when a thermal expansion coefficient of the metallized film is $\alpha_P$ and a thermal expansion coefficient of the metal layer is $\alpha_M$, a value of $\alpha_P/\alpha_M$ is 5.1 or less.

In the film capacitor of the present invention, the value of $\alpha_P/\alpha_M$ is preferably 1.1 to 5.1.

In the film capacitor of the present invention, the value of $\alpha_P/\alpha_M$ is preferably 4.3 or less. The value of $\alpha_P/\alpha_M$ is more preferably 1.3 to 4.3.

In the film capacitor of the present invention, a thickness of the dielectric resin film is preferably more than 0.5 μm and less than 10 μm, more preferably 2 μm to 6 μm.

In the film capacitor of the present invention, a thickness of the metal layer is preferably 5 nm to 40 nm.

In the film capacitor of the present invention, the metal layer preferably contains at least one metal selected from aluminum, titanium, zinc, magnesium, tin, and nickel.

In the film capacitor of the present invention, the dielectric resin film is preferably mainly composed of a resin having at least one of a urethane bond and a urea bond.

In the film capacitor of the present invention, the dielectric resin film may be mainly composed of a curable resin.

In the film capacitor of the present invention, the dielectric resin film may include at least one of an isocyanate group and a hydroxyl group.

In the film capacitor of the present invention, the dielectric resin film may be mainly composed of a thermoplastic resin.

A metallized film of the present invention includes a dielectric resin film and a metal layer on one surface of the dielectric resin film, in which, when a thermal expansion coefficient of the metallized film is $\alpha_P$ and a thermal expansion coefficient of the metal layer is $\alpha_M$, a value of $\alpha_P/\alpha_M$ is 5.1 or less.

In the metallized film of the present invention, the value of $\alpha_P/\alpha_M$ is preferably 1.1 to 5.1.

In the metallized film of the present invention, the dielectric resin film preferably has a thickness of more than 0.5 μm and less than 10 μm.

The present invention can provide a film capacitor which has excellent heat resistance when repeatedly used in a high temperature range and in which damage to a metal layer of a metallized film is suppressed.

DETAILED DESCRIPTION OF THE INVENTION

Hereinafter, a film capacitor and a metallized film of the present invention will be described.

However, the present invention is not limited to the configurations described below, and various modifications can be made without departing from the scope of the present invention.

The present invention also encompasses a combination of two or more desired structures of the present invention described below.

[Film Capacitor]

The film capacitor of the present invention includes a metallized film in which a metal layer is provided on one surface of a dielectric resin film. The metallized film used in the film capacitor of the present invention is also one aspect of the present invention.

Hereinafter, as one embodiment of the film capacitor of the present invention, there will be described an example of a wound film capacitor formed by being wound in a state where a first metallized film and a second metallized film are stacked.

The film capacitor of the present invention may be a stacked film capacitor formed by stacking the first metallized film and the second metallized film.

Figure 1:
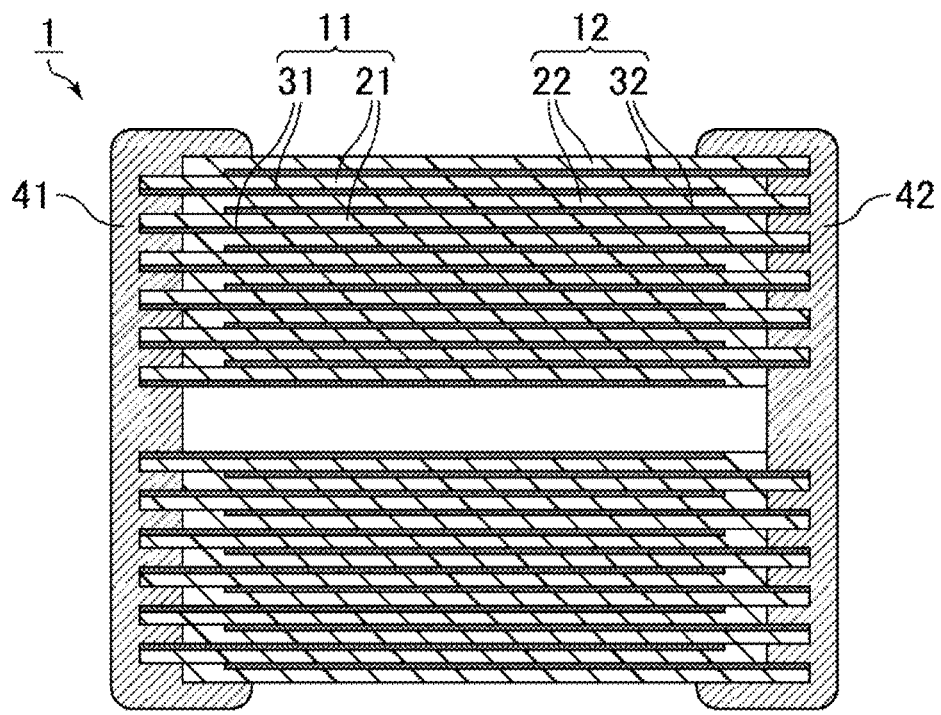
FIG. 1 is a cross-sectional view schematically showing an example of a film capacitor of the present invention.

FIG. 1 is a cross-sectional view schematically showing an example of the film capacitor of the present invention.

Figure 2:
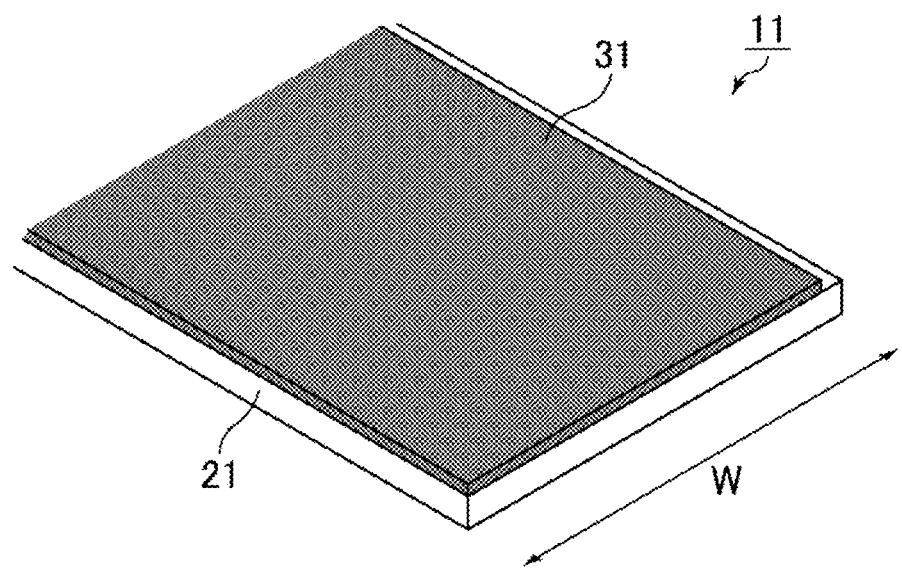
FIG. 2 is a perspective view schematically showing an example of a metallized film used in the film capacitor shown in FIG. 1.

FIG. 2 is a perspective view schematically showing an example of a metallized film used in the film capacitor shown in FIG. 1.

A film capacitor 1 shown in FIG. 1 is a wound film capacitor, and includes a first metallized film 11 and a second metallized film 12 in a wound state. As shown in FIG. 2, the first metallized film 11 includes a first dielectric resin film 21 and a first metal layer (first counter electrode) 31 provided on one surface of the first dielectric resin film 21. Similarly, the second metallized film 12 includes a second dielectric resin film 22 and a second metal layer (second counter electrode) 32 provided on one surface of the second dielectric resin film 22.

As shown in FIG. 1, the first metal layer 31 and the second metal layer 32 face each other with the first dielectric resin film 21 or the second dielectric resin film 22 interposed therebetween. The film capacitor 1 further includes a first external terminal electrode 41 electrically connected to the first metal layer 31, and a second external terminal electrode 42 electrically connected to the second metal layer 32.

The film capacitor 1 is configured by being wound into a state where the first metallized film 11 and the second metallized film 12 are stacked. The second dielectric resin film 22 may have a configuration different from the first dielectric resin film 21, but preferably has the same configuration as the first dielectric resin film 21.

The first metal layer 31 is formed to reach one side edge on one surface of the first dielectric resin film 21 but not to reach the other side edge. On the other hand, the second metal layer 32 is formed not to reach one side edge on one surface of the second dielectric resin film 22 but to reach the other side edge. The first metal layer 31 and the second metal layer 32 are made of, for example, an aluminum layer.

As shown in FIG. 1, the first dielectric resin film 21 and the second dielectric resin film 22 are stacked while being shifted from each other in a width direction (in the direction indicated by W in FIG. 2) so that both an end of the first metal layer 31 on the side reaching a side edge of the first dielectric resin film 21 and an end of the second metal layer 32 on the side reaching a side edge of the second dielectric resin film 22 are exposed from a stacked film. When the first dielectric resin film 21 and the second dielectric resin film 22 are wound in the stacked state, the first metal layer 31 and the second metal layer 32 are in a stacked state while maintaining the state of being exposed at their ends as well.

In the film capacitor 1 shown in FIG. 1, the second dielectric resin film 22 is wound to be outside the first dielectric resin film 21, and the first dielectric resin film 21 and the second dielectric resin film 22 are wound such that the first metal layer 31 and the second metal layer 32 face inward toward a center of the film capacitor 1.

The first external terminal electrode 41 and the second external terminal electrode 42 are formed, for example, by spraying zinc or the like on each end surface of a capacitor body obtained as described above. The first external terminal electrode 41 is in contact with the exposed end portion of the first metal layer 31, thereby being electrically connected to the first metal layer 31. On the other hand, the second external terminal electrode 42 is in contact with the exposed end portion of the second metal layer 32, thereby being electrically connected to the second metal layer 32.

In the film capacitor of the present invention, it is preferable that a wound body of the dielectric resin film be pressed into a flat shape such as an ellipse or oval in a cross-sectional shape to have a more compact shape. The film capacitor of the present invention may be provided with a cylindrical winding shaft. The winding shaft is disposed on a center axis of the wound dielectric resin film, and serves as a winding shaft when the dielectric resin film is wound.

In the film capacitor of the present invention, when a thermal expansion coefficient of the metallized film is $\alpha_P$ and a thermal expansion coefficient of the metal layer is $\alpha_M$, a value of $\alpha_P/\alpha_M$ is 5.1 or less.

In the film capacitor of the present invention, the value of $\alpha_P/\alpha_M$, which is a ratio of the thermal expansion coefficient $\alpha_P$ of the metallized film to the thermal expansion coefficient $\alpha_M$ of the metal layer, is 5.1 or less so that damage to the metal layer of the metallized film is suppressed when the film capacitor is repeatedly used in a high temperature range. Specifically, when a heat cycle test is performed in which heating to 135° C. and cooling to −55° C. are repeated for the film capacitor, occurrence of cracks in the metal layer and peeling of the metal layer were suppressed.

The thermal expansion coefficient $\alpha_P$ of the metallized film can be calculated from a dimensional change rate of the metallized film from 25° C. to 135° C. by a thermomechanical analysis (TMA) method. The thermal expansion coefficient $\alpha_P$ is preferably measured in the width direction (in the direction indicated by W in FIG. 2) of the metallized film.

As the thermal expansion coefficient $\alpha_M$ of the metal layer, the thermal expansion coefficient of each metal described in "THE ENGINEER'S BOOK, vol. 19, Technical Data Collection (HEISHIN Ltd.)" can be used.

When the metal layer is composed of a combination of two or more types of metals, the linear expansion coefficient $\alpha_M$ of the metal layer can be specified by analyzing the metal composition.

Specifically, it is possible to calculate a linear expansion coefficient of a composite metal composed of a combination of two or more types of metals according to the rule of mixture known using the following formula (for example, see http://www.gitc.pref.nagano.lg.jp/pdf/H18kenho/1-8-4.pdf):

Thermal expansion coefficient of composite metal=
(thermal expansion coefficient of metal $A$)×(volume ratio of metal $A$)+(thermal expansion coefficient of metal $B$)×(volume ratio of metal $B$)

From the viewpoint of suppressing damage to the metal layer, the value of $\alpha_P/\alpha_M$ is preferably 4.3 or less.

Although the lower limit of the value of $\alpha_P/\alpha_M$ is not particularly limited, if the thermal expansion coefficient $\alpha_P$ of the metallized film is too small with respect to the thermal expansion coefficient $\alpha_M$ of the metal layer, the metallized film tends to become brittle. Thus, the value of $\alpha_P/\alpha_M$ is preferably 1.1 or more, more preferably 1.3 or more.

In the film capacitor of the present invention, the dielectric resin film is preferably mainly composed of a resin having at least one of a urethane bond and a urea bond. Examples of such a resin include a urethane resin having a urethane bond and a urea resin having a urea bond. The resin may have both the urethane bond and the urea bond. Specific examples include curable resins and vapor-deposited polymer films described later.

The presence of urethane bonds and/or urea bonds can be confirmed using a Fourier transform infrared spectrophotometer (FT-IR).

In the present specification, the "main component" or "mainly composed of" means a component having the highest abundance ratio (% by weight), preferably a component having an abundance ratio exceeding 50% by weight. Therefore, the film for a film capacitor of the present invention may contain, as components other than the main component, for example, an additive such as a silicone resin or an uncured portion of a starting material such as a first organic material and a second organic material described later.

In the film capacitor of the present invention, the dielectric resin film may be mainly composed of a curable resin. The curable resin may be a thermosetting resin or a photocurable resin. The curable resin may or may not have at least one of a urethane bond and a urea bond.

In the present description, the thermosetting resin means a resin that can be, but does not have to be, cured by heat, and does not limit the curing method. Therefore, a resin cured by a method other than heat (for example, light, electron beam, etc.) is also included in the thermosetting resin. Depending on the material, the reaction may start due to reactivity of the material itself, and resins gradually cured without necessarily applying heat or light from the outside are also regarded as thermosetting resins. The same applies to the photocurable resin, and the curing method is not limited.

In the film capacitor of the present invention, the dielectric resin film may be mainly composed of a vapor-deposited polymer film. The vapor-deposited polymer film may or may not have at least one of a urethane bond and a urea bond. The vapor-deposited polymer film is basically included in the curable resin.

In the film capacitor of the present invention, the dielectric resin film is preferably made of a cured product of a first organic material and a second organic material. Examples of the cured product include a cured product obtained by reacting a hydroxyl group (OH group) of the first organic material with an isocyanate group (NCO group) of the second organic material.

When a cured product is obtained by the above reaction, an uncured portion of a starting material may remain in the film. For example, the dielectric resin film may include at least one of an isocyanate group (NCO group) and a hydroxyl group (OH group). In this case, the dielectric resin film may contain either an isocyanate group or a hydroxyl group, or may contain both an isocyanate group and a hydroxyl group.

The presence of isocyanate groups and/or hydroxyl groups can be confirmed using a Fourier transform infrared spectrophotometer (FT-IR).

The first organic material is preferably a polyol having a plurality of hydroxyl groups (OH groups) in the molecule. Examples of the polyol include polyether polyol, polyester polyol, and polyvinyl acetoacetal.

Two or more organic materials may be used in combination as the first organic material. Among the first organic materials, a phenoxy resin belonging to the polyether polyol is preferable.

The second organic material is preferably an isocyanate compound, epoxy resin or melamine resin having a plurality of functional groups in the molecule. Two or more organic materials may be used in combination as the second organic material.

Examples of the isocyanate compound include aromatic polyisocyanates such as diphenylmethane diisocyanate (MDI) and tolylene diisocyanate (TDI), and aliphatic polyisocyanates such as hexamethylene diisocyanate (HDI). A modified product of these polyisocyanates, for example, a modified product having carbodiimide or urethane may be used. Among them, aromatic polyisocyanate is preferable, and MDI is more preferable.

The epoxy resin is not particularly limited as long as it has an epoxy ring, and examples thereof include bisphenol A type epoxy resin, biphenyl skeleton epoxy resin, cyclopentadiene skeleton epoxy resin, and naphthalene skeleton epoxy resin.

The melamine resin is not particularly limited as long as it is an organic nitrogen compound having a triazine ring at the center of the structure and three amino groups around the triazine ring, and examples thereof include alkylated melamine resins. Other modified products of melamine may be employed.

In the film capacitor of the present invention, the dielectric resin film is preferably obtained by forming a resin solution containing the first organic material and the second organic material into a film, and then curing the film by heat treatment.

In the film capacitor of the present invention, the dielectric resin film may be mainly composed of a thermoplastic resin. Examples of the thermoplastic resin include highly crystalline polypropylene, polyethersulfone, polyetherimide, and polyallyl arylate.

In the film capacitor of the present invention, the dielectric resin film can also contain an additive for adding other functions. For example, smoothness can be imparted by adding a leveling agent. The additive is more preferably a material that has a functional group reacting with a hydroxyl group and/or an isocyanate group and forms a portion of a crosslinked structure of a cured product. Examples of such a material include a resin having at least one functional group selected from the group consisting of an epoxy group, a silanol group, and a carboxyl group.

In the film capacitor of the present invention, the thickness of the dielectric resin film is not particularly limited. However, if the film is too thin, it tends to be brittle. Thus, the thickness of the dielectric resin film is preferably more than 0.5 μm, more preferably 2 μm or more. On the other hand, if the film is too thick, defects such as cracks are likely to occur during film formation. Thus, the thickness of the dielectric resin film is preferably less than 10 μm, more preferably 6 μm or less.

The thickness of the dielectric resin film can be measured using an optical film thickness meter.

In the film capacitor of the present invention, the type of metal contained in the metal layer is not particularly limited. However, the metal layer preferably contains at least one selected from aluminum (Al), titanium (Ti), zinc (Zn), magnesium (Mg), tin (Sn), and nickel (Ni).

In the film capacitor of the present invention, the thickness of the metal layer is not particularly limited, but is preferably 5 nm to 40 nm from the viewpoint of suppressing damage to the metal layer.

The thickness of the metal layer can be specified by observing a cross section, obtained by cutting the metallized film along the thickness direction, with an electron microscope such as a field emission scanning electron microscope (FE-SEM).

Although the film capacitor of the present invention can be applied to known applications, the life of equipment used in an environment with large temperature changes at high temperatures can be extended. Therefore, the film capacitor is suitably used for power electronics equipment such as electric compressors/pumps, chargers, DC-DC converters, and drive inverters, which are mounted in automobiles and industrial equipment.

EXAMPLES

Hereinafter, examples specifically showing the film capacitor of the present invention will be described. The present invention is not limited to only these examples.

Example 1

Samples 1 to 6 were prepared under the conditions shown in Table 1.

A phenoxy resin was provided as a first organic material (shown as organic material 1 in Table 1), and diphenylmethane diisocyanate (MDI) was provided as a second organic material (shown as organic material 2 in Table 1). As the phenoxy resin, a phenoxy resin which was a high molecular weight bisphenol A type epoxy resin having an epoxy group at the terminal was used. Diphenylmethane diisocyanate was used as MDI.

Next, a resin solution obtained by mixing the first organic material and the second organic material was molded on a PET film with a doctor blade coater to obtain an uncured film. The film was heat-treated and cured under conditions shown in Table 1 to obtain a dielectric resin film (hereinafter also simply referred to as a film). Sample 1 was heat treated at 180° C. for 2 hours, and Samples 2 to 6 were heat treated at 180° C. for 10 hours.

The cured film was a urethane resin having a urethane bond, and was also a urea resin having a urea bond. The film thickness after curing was 3 μm. When the film thickness was determined, three points were measured at positions where a 10 cm long film was separated by a distance of 2 cm, and the average was calculated.

Aluminum to be a counter electrode (metal layer) was deposited on the film surface so as to have a thickness of 20 nm, and peeled from a PET substrate to obtain a metallized film.

After the metallized film was wound, an external electrode was formed from sprayed metal to produce a 20 μF film capacitor.

Table 1 shows the values of the thermal expansion coefficient $\alpha_M$ of the metal layer, the thermal expansion coefficient $\alpha_P$ of the metallized film, and $\alpha_P/\alpha_M$.

As the thermal expansion coefficient $\alpha_M$ of the metal layer, the thermal expansion coefficient of each metal described in "THE ENGINEER'S BOOK, vol. 19, Technical Data Collection" was used.

The thermal expansion coefficient $\alpha_P$ of the metallized film was calculated from the dimensional change rate of the metallized film from 25° C. to 135° C. by a thermomechanical analysis (TMA) method. The thermal expansion coefficient $\alpha_P$ was measured in the width direction of the metallized film.

[Judgment Method]

Tests of Judgments 1 and 2 were performed on the film capacitors of Samples 1 to 6.

In Judgment 1, the heat cycle test was performed in which heating to 135° C. and cooling to −55° C. were repeated for each film capacitor. The test was performed under such conditions that for a temperature increase rate and a temperature decrease rate, a change from the temperature lower limit to the temperature upper limit and a change from the temperature upper limit to the temperature lower limit were each within 5 minutes. A holding time at each temperature was 30 minutes. After the film capacitor after 2000 cycles was disassembled, 1 m of the metallized film was sampled in the length direction, and a vapor deposition surface of the metal layer was observed.

A case where the number of cracks generated in the metal layer was 0 was evaluated as ○ (good), and a case where the number of cracks was 1 or more was evaluated as x (poor).

In Judgment 2, a bending test of the metallized film constituting each film capacitor was performed. Ten strip-shaped test pieces of 1 cm×5 cm were prepared, the bending test was performed ten times for each test piece, and whether or not the test piece was broken was confirmed. A case where the number of breaks was 0 was evaluated as ○ (good), a case where the number of breaks was 1 to 3 was evaluated as Δ (not so good), and a case where the number of breaks was 4 or more was evaluated as x (poor).

TABLE 1

| | Dielectric resin film | | | Metal layer | | | | | |
| --- | --- | --- | --- | --- | --- | --- | --- | --- | --- |
| | Organic material 1 | Organic material 2 | Heat | | | | | | |
| Sample No. | Phenoxy [wt %] | MDI [wt %] | treatment condition | Type of metal | $\alpha_M$ [ppm/° C.] | $\alpha_P$ [ppm/° C.] | $\alpha_P/\alpha_M$ | Judgment 1 | Judgment 2 |
| *1 | 60 | 40 | 180° C./2 hr | Al | 23.6 | 145 | 6.1 | x | ○ |
| 2 | 30 | 70 | 180° C./10 hr | Al | 23.6 | 20 | 0.8 | ○ | x |
| 3 | 35 | 65 | 180° C./10 hr | Al | 23.6 | 24 | 1.0 | ○ | x |
| 4 | 40 | 60 | 180° C./10 hr | Al | 23.6 | 30 | 1.3 | ○ | ○ |
| 5 | 60 | 40 | 180° C./10 hr | Al | 23.6 | 75 | 3.2 | ○ | ○ |
| 6 | 80 | 20 | 180° C./10 hr | Al | 23.6 | 100 | 4.2 | ○ | ○ |

In Table 1, those samples with an asterisk (*) before to their numbers are comparative examples, outside the scope of the present invention.

From the result of Judgment 1, it is considered that damage to the metal layer can be suppressed by reducing the thermal expansion coefficient $\alpha_P$ of the metallized film with respect to the thermal expansion coefficient $\alpha_M$ of the metal layer.

In Sample 2 in which the value of $\alpha_P/\alpha_M$ was 0.8 and Sample 3 in which the value of $\alpha_P/\alpha_M$ was 1.0, the result of Judgment 2 was evaluated as x. This is presumably because the thermal expansion coefficient $\alpha_P$ of the metallized film is too small with respect to the thermal expansion coefficient $\alpha_M$ of the metal layer, the metallized film tends to become brittle.

Example 2

[Production of Film Capacitor]

Samples 11 to 24 were prepared under the conditions shown in Table 2.

In Example 2, a film capacitor was produced in the same manner as in Example 1 except that the type of metal of the metal layer, the thermal expansion coefficient $\alpha_M$ of the metal layer, and the thermal expansion coefficient $\alpha_P$ of the metallized film were changed. The film thickness was 3 μm, and the thickness of the metal layer was 20 nm.

[Judgment Method]

A test of Judgment 1 was performed on the film capacitors of Samples 11 to 24.

The method of Judgment 1 is the same as that in Example 1.

TABLE 2

| Sample No. | Metal layer Type of metal | $\alpha_M$ [ppm/° C.] | $\alpha_P$ [ppm/° C.] | $\alpha_P/\alpha_M$ | Judgment 1 |
|---|---|---|---|---|---|
| 11 | Zn | 39.7 | 140 | 3.5 | ○ |
| *12 | Mg | 27.1 | 140 | 5.2 | X |
| 13 | Al | 23.6 | 30 | 1.3 | ○ |
| 14 | Al | 23.6 | 75 | 3.2 | ○ |
| 15 | Al | 23.6 | 100 | 4.2 | ○ |
| *16 | Al | 23.6 | 140 | 5.9 | X |
| 17 | Sn | 23.0 | 75 | 3.3 | ○ |
| 18 | Sn | 23.0 | 100 | 4.3 | ○ |
| *19 | Sn | 23.0 | 140 | 6.1 | X |
| *20 | Ni | 12.3 | 75 | 6.1 | X |
| *21 | Ni | 12.3 | 100 | 8.1 | X |
| 22 | Ti | 8.4 | 30 | 3.6 | ○ |
| *23 | Ti | 8.4 | 75 | 8.9 | X |
| *24 | Ti | 8.4 | 100 | 11.9 | X |

In Table 2, those samples with an asterisk (*) before to their numbers are comparative examples, outside the scope of the present invention.

From the result of Judgment 1, it is considered that damage to the metal layer can be suppressed by reducing the thermal expansion coefficient $\alpha_P$ of the metallized film with respect to the thermal expansion coefficient $\alpha_M$ of the metal layer regardless of the type of metal of the metal layer.

Example 3

[Production of Film Capacitor]

Samples 31 to 38 were prepared under the conditions shown in Table 3.

In Example 3, a film capacitor was produced in the same manner as in Example 1 except that the thickness of the dielectric resin film, the thickness of the metal layer, the type of metal of the metal layer, and the thermal expansion coefficient $\alpha_M$ of the metal layer were changed. The thermal expansion coefficient $\alpha_P$ of the metallized film was 75 ppm/° C.

[Judgment Method]

Tests of Judgments 1, 2, and 3 were performed on the film capacitors of Samples 31 to 38. The methods of Judgments 1 and 2 are the same as those in Example 1.

In Judgment 3, a 10 cm×10 cm undeposited film was produced, and the number of coating film defects (cracks) was measured by observation with an optical microscope. A case where the number of defects was 0 was evaluated as ○ (good), a case where the number of defects was 1 to 2 was evaluated as Δ (not so good), and a case where the number of defects was 3 or more was evaluated as x (poor).

TABLE 3

| Sample No. | Dielectric resin film Thickness [μm] | Metal layer Thickness [nm] | Type of metal | $\alpha_M$ [ppm/° C.] | $\alpha_P$ [ppm/° C.] | $\alpha_P/\alpha_M$ | Judgment 1 | Judgment 2 | Judgment 3 |
|---|---|---|---|---|---|---|---|---|---|
| 31 | 3 | 20 | Al | 23.6 | 75 | 3.2 | ○ | ○ | ○ |
| *32 | 3 | 20 | Ti | 8.4 | 75 | 8.9 | X | ○ | ○ |
| 33 | 2 | 5 | Al | 23.6 | 75 | 3.2 | ○ | ○ | ○ |
| *34 | 2 | 5 | Ti | 8.4 | 75 | 8.9 | X | ○ | ○ |
| 35 | 6 | 40 | Al | 23.6 | 75 | 3.2 | ○ | ○ | ○ |
| *36 | 6 | 40 | Ti | 8.4 | 75 | 8.9 | X | ○ | ○ |
| 37 | 0.5 | 40 | Al | 23.6 | 75 | 3.2 | ○ | Δ | ○ |
| 38 | 10 | 40 | Al | 23.6 | 75 | 3.2 | ○ | ○ | Δ |

In Table 3, those samples with an asterisk (*) before to their numbers are comparative examples, outside the scope of the present invention.

From the result of Judgment 1, it is considered that damage to the metal layer can be suppressed by reducing the thermal expansion coefficient $\alpha_P$ of the metallized film with respect to the thermal expansion coefficient $\alpha_M$ of the metal layer regardless of the thickness of the dielectric resin film and the thickness of the metal layer.

For Sample 37 in which the thickness of the dielectric resin film was 0.5 μm, the result of Judgment 2 was evaluated as Δ. This is presumably because the film becomes brittle when the film is too thin.

On the other hand, for Sample 38 in which the thickness of the dielectric resin film was 10 μm, the result of Judgment 3 was evaluated as Δ. This is presumably because if the film is too thick, the amount of a solvent contained in an uncured film increases and cracks are likely to occur during curing.

Example 4

[Production of Film Capacitor]

Samples 41 to 43 were prepared under the conditions shown in Table 4.

In Example 4, a film capacitor was produced in the same manner as in Example 1 except that the material of the dielectric resin film was changed. The film thickness was 3 μm, and the thickness of the metal layer was 20 nm.

In Sample 41, polyvinyl acetoacetal (PVAA) was used as the first organic material (shown as Organic material 1 in Table 4), and tolylene diisocyanate (TDI) was used as the second organic material (shown as Organic material 2 in Table 4).

As TDI, trimethylpropanol-modified tolylene diisocyanate was used.

In Sample 42, a phenoxy resin was used as the first organic material, and a melamine resin was used as the second organic material. As the phenoxy resin, a phenoxy resin which was a high molecular weight bisphenol A type epoxy resin having an epoxy group at the terminal was used. As the melamine resin, an alkylated melamine resin was used.

In Sample 43, a phenoxy resin was used as the first organic material, and an epoxy resin was used as the second organic material. As the phenoxy resin, a phenoxy resin which was a high molecular weight bisphenol A type epoxy resin having an epoxy group at the terminal was used. As the epoxy resin, a novolac type epoxy resin was used. In order to advance the curing reaction, 0.1% imidazole catalyst was added as a catalyst.

[Judgment Method]

Tests of Judgments 1, 2, and 3 were performed on the film capacitors of Samples 41 to 43. The methods of Judgments 1 and 2 are the same as in Example 1, and the method of Judgment 3 is the same as in Example 3.

TABLE 4

| | Dielectric resin film | | | | | Metal layer | | | | | |
|---|---|---|---|---|---|---|---|---|---|---|---|
| | Constituent material | | Mixing ratio [wt %] | | Heat | | | | | | |
| Sample No. | Organic material 1 | Organic material 2 | Organic material 1 | Organic material 2 | treatment condition | Type of metal | $\alpha_M$ [ppm/° C.] | $\alpha_P$ [ppm/° C.] | $\alpha_P/\alpha_M$ | Judgment 1 | Judgment 2 | Judgment 3 |
| 41 | PVAA | TDI | 40 | 60 | 180° C./10 h | Al | 23.6 | 70 | 3.0 | ○ | ○ | ○ |
| 42 | Phenoxy | Melamine | 40 | 60 | 180° C./10 h | Al | 23.6 | 60 | 2.5 | ○ | ○ | ○ |
| 43 | Phenoxy | Epoxy | 40 | 60 | 180° C./10 h | Al | 23.6 | 65 | 2.8 | ○ | ○ | ○ |

From Table 4, it was confirmed that the same results as in Example 1 and Example 3 were obtained even when the material of the dielectric resin film was changed.

Example 5

[Production of Film Capacitor]

Samples 51 to 55 were prepared under the conditions shown in Table 5.

In Example 5, a film capacitor was produced in the same manner as in Example 1 except that the material and thickness of the dielectric resin film were changed. In Samples 51 to 55, a thermoplastic resin was used as the material of the dielectric resin film. The thickness of the metal layer was 20 nm.

[Judgment Method]

A test of Judgment 1 was performed on the film capacitors of Samples 51 to 55.

The method of Judgment 1 is the same as that in Example 1.

TABLE 5

| | Dielectric resin film | | Metal layer | | | | | |
|---|---|---|---|---|---|---|---|---|
| Sample No. | Type of resin | Thickness [μm] | Thickness [μm] | Type of metal | $\alpha_M$ [ppm/° C.] | $\alpha_P$ [ppm/° C.] | $\alpha_P/\alpha_M$ | Judgment 1 |
| * 51 | Polypropylene | 3 | 20 | Al | 23.6 | 140 | 5.9 | x |
| 52 | Highly crystalline polypropylene | 5 | 20 | Al | 23.6 | 90 | 3.8 | ○ |

TABLE 5-continued

| | Dielectric resin film | | Metal layer | | | | | |
|---|---|---|---|---|---|---|---|---|
| Sample No. | Type of resin | Thickness [μm] | Thickness [μm] | Type of metal | $\alpha_M$ [ppm/°C.] | $\alpha_P$ [ppm/°C.] | $\alpha_P/\alpha_M$ | Judgment 1 |
| 53 | Polyethersulfone | 3 | 20 | Al | 23.6 | 55 | 2.3 | ○ |
| 54 | Polyetherimide | 3 | 20 | Al | 23.6 | 60 | 2.5 | ○ |
| 55 | Polyallyl arylate | 4 | 20 | Al | 23.6 | 65 | 2.8 | ○ |

In Table 5, the sample with an asterisk (*) before to its number is a comparative example, outside the scope of the present invention.

From Table 5, it was confirmed that the same results as in Example 1 were obtained even when a thermoplastic resin was used as the material of the dielectric resin film.

DESCRIPTION OF REFERENCE SYMBOLS

1: Film capacitor
11: First metallized film
12: Second metallized film
21: First dielectric resin film
22: Second dielectric resin film
31: First counter electrode (first metal layer)
32: Second counter electrode (second metal layer)
41: First external terminal electrode
42: Second external terminal electrode

The invention claimed is:

1. A film capacitor comprising:
a metallized film, the metallized film comprising:
a dielectric resin film; and
a metal layer on one surface of the dielectric resin film,
wherein, when a thermal expansion coefficient of the metallized film is $\alpha_P$ and a thermal expansion coefficient of the metal layer is $\alpha_M$, a value of $\alpha_P/\alpha_M$ is 5.1 or less.

2. The film capacitor according to claim 1, wherein the value of $\alpha_P/\alpha_M$ is 1.1 to 5.1.

3. The film capacitor according to claim 1, wherein the value of $\alpha_P/\alpha_M$ is 4.3 or less.

4. The film capacitor according to claim 1, wherein the value of $\alpha_P/\alpha_M$ is 1.3 to 4.3.

5. The film capacitor according to claim 1, wherein the dielectric resin film has a thickness of more than 0.5 μm and less than 10 μm.

6. The film capacitor according to claim 3, wherein the dielectric resin film has a thickness of 2 μm to 6 μm.

7. The film capacitor according to claim 5, wherein the metal layer has a thickness of 5 nm to 40 nm.

8. The film capacitor according to claim 1, wherein the metal layer comprises at least one of aluminum, titanium, zinc, magnesium, tin, and nickel.

9. The film capacitor according to claim 8, wherein the dielectric resin film is mainly composed of a resin having at least one of a urethane bond and a urea bond.

10. The film capacitor according to claim 8, wherein the dielectric resin film is mainly composed of a curable resin.

11. The film capacitor according to claim 8, wherein the dielectric resin film includes at least one of an isocyanate group and a hydroxyl group.

12. The film capacitor according to claim 8, wherein the dielectric resin film is mainly composed of a thermoplastic resin.

13. A metallized film comprising:
a dielectric resin film; and
a metal layer on one surface of the dielectric resin film,
wherein, when a thermal expansion coefficient of the metallized film is $\alpha_P$ and a thermal expansion coefficient of the metal layer is $\alpha_M$, a value of $\alpha_P/\alpha_M$ is 5.1 or less.

14. The metallized film according to claim 13, wherein the value of $\alpha_P/\alpha_M$ is 1.1 to 5.1.

15. The metallized film according to claim 13, wherein the value of $\alpha_P/\alpha_M$ is 4.3 or less.

16. The metallized film according to claim 15, wherein the value of $\alpha_P/\alpha_M$ is 1.3 to 4.3.

17. The metallized film according to claim 13, wherein the dielectric resin film has a thickness of more than 0.5 μm and less than 10 μm.

18. The metallized film according to claim 15, wherein the dielectric resin film has a thickness of 2 μm to 6 μm.

19. The metallized film according to claim 17, wherein the metal layer has a thickness of 5 nm to 40 nm.

20. The metallized film according to claim 13, wherein the metal layer comprises at least one of aluminum, titanium, zinc, magnesium, tin, and nickel.

* * * * *